(12) United States Patent
Kaplan et al.

(10) Patent No.: US 7,783,296 B2
(45) Date of Patent: Aug. 24, 2010

(54) METHOD FOR MEASURING ROAD TRAFFIC LOAD BASED ON ANALYZING CELLULAR COMMUNICATIONS

(76) Inventors: Yossi Kaplan, 14 Haonla, Rishon Lezion (IL) 75438; Ofer Avni, 1 Gizo street, Gizo (IL) 99745

( * ) Notice: Subject to any disclaimer, the term of this patent is extended or adjusted under 35 U.S.C. 154(b) by 61 days.

(21) Appl. No.: 10/523,149

(22) PCT Filed: Jul. 9, 2003

(86) PCT No.: PCT/IL03/00565
§ 371 (c)(1),
(2), (4) Date: Jan. 24, 2005

(87) PCT Pub. No.: WO2004/010401
PCT Pub. Date: Jan. 29, 2004

(65) Prior Publication Data
US 2005/0227696 A1    Oct. 13, 2005

(30) Foreign Application Priority Data
Jul. 24, 2002    (IL)    .................................... 150894

(51) Int. Cl.
*H04W 24/00*    (2009.01)
(52) U.S. Cl. .............. 455/456.1; 455/456.2; 455/456.3; 455/456.5; 455/436; 701/201; 701/207; 701/210; 701/211; 340/988; 340/995.1; 340/995.22
(58) Field of Classification Search .............. 455/414.1, 455/456.1–456.6, 436–444, 446, 447; 701/201, 701/207, 213, 215, 119, 200, 209, 210, 25, 701/26, 211; 342/457, 464; 340/998, 995.1, 340/995.22; 370/328, 329, 330, 331, 332, 370/333
See application file for complete search history.

(56) References Cited

U.S. PATENT DOCUMENTS 6,052,598 A * 4/2000 Rudrapatna et al. ...... 455/456.1

(Continued)

OTHER PUBLICATIONS

Martin Hellebrandt, Rudolf Mathar and Markus Scheibenbogen, Estimating Position and Velocity of Mobiles in a Cellular Radio Network, Feb. 1997, IEEE Transactions on Vehicular Technology, vol. 46, No. 1, pp. 65-71.*

(Continued)

*Primary Examiner*—Charles N Appiah
*Assistant Examiner*—Olumide T Ajibade Akonai
(74) *Attorney, Agent, or Firm*—Smith Frohwein Tempel Greenlee Blaha, LLC; Gregory Scott Smith (57) ABSTRACT

Continuously extracting traffic load and speed on roads within the coverage area of a cellular network using only data that arrives to the cellular switch implanted in the following stages: (a) a learning phase, which can include vehicle(s) with a location device (i.e., a GPS system) traveling across the covered routes and collecting cellular data and location data in parallel, analyzing the accumulated data and processing the date to create a reference database; and (b) an operational stage in which communications on the cellular network are monitored continuously, and matched against the reference database in to locate their route and speed. The data analysis and data base structure are provided in a manner that enables in the operational stage fast and reliable initial identification of the vehicle's route, based only on the cell ID of handovers; follow-up forward and backwards of the vehicle's route; and real-time incident detection.

26 Claims, 6 Drawing Sheets

U.S. PATENT DOCUMENTS

| | | | |
|---|---|---|---|
| 6,381,463 B1 * | 4/2002 | Tu et al. | 455/456.5 |
| 6,385,454 B1 * | 5/2002 | Bahl et al. | 455/450 |
| 6,522,888 B1 * | 2/2003 | Garceran et al. | 455/456.3 |
| 6,552,682 B1 * | 4/2003 | Fan | 342/357.09 |
| 6,711,408 B1 * | 3/2004 | Raith | 455/440 |
| 6,799,046 B1 * | 9/2004 | Tang | 455/456.1 |
| 7,002,489 B1 * | 2/2006 | Denker et al. | 340/988 |
| 2002/0102976 A1 * | 8/2002 | Newbury et al. | 455/436 |
| 2006/0072501 A1 * | 4/2006 | Toshimitsu et al. | 370/328 |

OTHER PUBLICATIONS

Tong Liu, Paramvir Bahl, Imrich Chlamtac, Mobility Modeling, Location Tracking, and Trajectory Prediction in Wireless ATM Networks, Aug. 1998, IEEE Journal on Selected Areas in Communications, vol. 16, No. 6, pp. 922-936.*

* cited by examiner

FIGURE 1-A
STREET 1 CELLS

| Cells / Trip | 1 | 2 | 3 | 4 | 5 | 6 | 7 | 8 | 9 | 10 |
|---|---|---|---|---|---|---|---|---|---|---|
| 1 | A | B | C | D | F | Y | G | H | I | J |
| 2 | Y | A | Q | C | D | T | G | I | J | C |
| 3 | S | T | Q | B | C | D | G | H | J | S |
| 4 | A | Q | W | D | Z | X | S | H | I | T |

FIGURE 1-B
STREET 2 CELLS

| Cells / Trip | 1 | 2 | 3 | 4 | 5 | 6 | 7 | 8 | 9 | 10 |
|---|---|---|---|---|---|---|---|---|---|---|
| 1 | M | Q | W | R | L | N | G | H | I | T |
| 2 | T | A | W | R | L | K | G | H | J | T |
| 3 | Q | W | R | L | C | S | H | I | J | V |
| 4 | Q | W | C | L | S | H | I | T | P | Z |

FIGURE 1-C
CHAIN CLUSTERS (3 OUT OF 4 MATCHES)

| NO. | STREET | HEADER | MATCHING DRIVES |
|---|---|---|---|
| 1 | 1 | S1/T2 (2-5) | S1/T1 (1-4), S1/T3 (3-6), S1/T4 (1-4) |
| 2 | 1-2 | S1/T1 (7-10) | S1/T2 (7-10), S1/T3 (7-10), S2/T1(7-10), S2/T2 (7-10), S2/T3 (7-10) |
| 3 | 2 | S2/T1 (2-5) | S2/T2 (2-5), S2/T3 (1-4), S2/T4 (1-4) |

FIGURE 1-D
UNIQUE CLUSTERS (3 OUT OF 4 MATCHES)

| NO. | HEADER | MATCHING DRIVES |
|---|---|---|
| 1 | S1/T2 (2-5) | S1/T1 (1-4), S1/T3 (3-6), S1/T4 (1-4) |
| 2 | S2/T1 (2-5) | S2/T2 (2-5), S2/T3 (1-4), S2/T4 (1-4) |

FIGURE 2-A
ACCURATE HANDOVER

FIGURE 2-B
INACURATE HANDOVER

FIGURE 3-A
STREET 1 CELLS

| Cells Trip | 1 | 2 | 3 | 4 | 5 | 6 | 7 | 8 | 9 | 10 |
|---|---|---|---|---|---|---|---|---|---|---|
| 1 | A | B | C | D | F | Y | G | H | I | J |
| 2 | Y | W | Q | C | D | T | G | I | J | C |
| 3 | S | T | Q | B | C | D | G | H | J | S |
| 4 | A | Q | W | D | Z | X | S | H | I | T |

FIGURE 3-B
CHAIN CLUSTERS (3 OUT OF 5 MATCHES)

| NO. | HEADER | MATCHING DRIVES |
|---|---|---|
| 1 | T3 (3-7) | T1 (1-5), T2 (2-6) |
| 2 | T1 (6-10) | T2(6-10), T3(6-10) |

FIGURE 3-C
OPERATIONAL DRIVE DATA

| NO. | 1 | 2 | 3 | 4 | 5 | 6 | 7 | 8 | 9 | 10 |
|---|---|---|---|---|---|---|---|---|---|---|
| CELL | S | T | W | R | C | D | G | L | J | S |
| TIME | 8:00:25 | 8:01:11 | 8:01:43 | 8:02:17 | 8:03:31 | 8:04:04 | 8:04:57 | 8:05:31 | 8:05:57 | 8:07:01 |

FIGURE 3-D
INITIAL CHAIN MATCHING (3 OUT OF 4)

TRIP 3 (4-7) – [B, C, D, G]

FIGURE 3-E
ADDITIONAL MATCHES (2 OUT OF 3)

TRIP 3 (1-3) [S, T, Q], TRIP 3 (8-10) [H, J, S]

FIGURE 3-F
HANDOVER DATA FORWARDED TO SPEED DETERMONATION

| NO. | FIRST CELL | SECOND CELL | TIME |
|---|---|---|---|
| 1 | S | T | 8:01:11 |
| 2 | C | D | 8:04:04 |
| 3 | D | G | 8:04:57 |
| 4 | J | S | 8:07:01 |

FIGURE 4-A
STREET 2 CELLS

| Cells Trip | 1 | 2 | 3 | 4 | 5 | 6 | 7 | 8 | 9 | 10 |
|---|---|---|---|---|---|---|---|---|---|---|
| 1 | M | Q | W | R | L | N | G | H | I | T |
| 2 | T | A | W | R | L | K | G | H | J | T |
| 3 | Q | W | R | L | C | S | H | I | J | V |
| 4 | Q | W | C | L | S | H | I | T | P | Z |

FIGURE 4-B
LAST CELLS RECEIVED FROM OPERATIONAL DRIVE

| NO. | 1 | 2 | 3 | 4 | 5 | 6 | 7 |
|---|---|---|---|---|---|---|---|
| CELL | T | Q | S | R | L | NO DATA | NO DADA |
| TIME | 7:10:15 | 7:11:22 | 7:13:47 | 7:14:17 | 7:16:18 | 7:17:18 | 7:18:18 |

FIGURE 4-C
NEXT POSSIBLE CELLS DISTANCE

| NO. | FIRST CELL | SECOND CELL | DISTANCE (METERS) |
|---|---|---|---|
| 1 | L | N | 100 |
| 2 | L | K | 200 |
| 3 | L | C | 150 |

FIGURE. 4-D
MAXIMAL SPEED ACROSS ROUTE SECTION

| TIME | ROUTE | MAXIMAL SPEED |
|---|---|---|
| 7:17:18 | STREET1 | 12 KM/H |
| 7:18:18 | STREET1 | 6KM/H |

FIGURE 5-A
HANDOVER RATE IN REGULAR OFF PEAK HOURS

| ADJACANT HANDOVRS | A-B | B-C | C-D |
|---|---|---|---|
| TIME DIFFERENCE (SEC) | 90 | 150 | 120 |

FIGURE 5-B
HANDOVER RATE DURING AN INCIDENT

| ADJACANT HANDOVRS / TIME DIFFERENCE (SEC) | A-B | B-C | C-D |
|---|---|---|---|
| T1 | 88 | 148 | 121 |
| T2 | 91 | 249 | 122 |
| T3 | 157 | 353 | 119 |
| T4 | 274 | 444 | 122 |
| T5 | 357 | 595 | 120 |
| ⋮ | ⋮ | ⋮ | ⋮ |
| T6 | 393 | 492 | 197 |
| T7 | 316 | 256 | 229 |
| T8 | 228 | 175 | 179 |
| T9 | 147 | 149 | 139 |
| T10 | 94 | 152 | 122 |

FIGURE 6-A
SPEED DETERMINATION - LOCATION ACCURACY & SECTION COVERAGE

| CALL NUMBER | ROUTE SUB SECTION | SUB SECTION LENGTH | SUB SECTION EDGES LOCATION ACCURACY |
|---|---|---|---|
| 1 | AC | 390 | 80 |
| 2 | BE | 590 | 60 |
| 3 | DF | 400 | 40 |
| 4 | AF | 1000 | 100 |

FIGURE 6-B
SPEED DETERMINATION – REPORTS TIMING

| TIME | SPEED |
|---|---|
| 8:40 | 64 |
| 8:45 | 60 |
| 8:50 | 71 |
| 8:55 | 70 |
| 9:00 | 75 |

| PERIOD | SPEED |
|---|---|
| 8:40-8:50 | 65 |
| 8:45-8:55 | 67 |
| 8:50-9:00 | 72 |
| 8:40-9:00 | 68 |

METHOD FOR MEASURING ROAD TRAFFIC LOAD BASED ON ANALYZING CELLULAR COMMUNICATIONS

This application claims the benefit of the priority date of Israeli application serial number 150894/2IL filed on Jul. 24, 2002 and PCT application number PCT/IL2003.000565 filed on Jul. 9, 2003.

FIELD

This invention relates generally to traffic load monitoring, and in particular to extracting speed and incident data out of the cellular phone system.

BACKGROUND

Kennedy (U.S. Pat. No. 5,657,487) teaches the use of handovers to determine vehicles speed and the number of vehicles driving on a certain route. Kennedy does not supply a solution to the very common problem in metropolitan areas of the same handovers relating to several different routes. This invention also discloses an extremely expensive implementation requiring RF receivers spread over the covered area.

Kaplan et al (WO 02/03350 A1) discloses a low cost, totally passive method (monitoring the cellular network without sending any messages) to extract traffic information from any cellular network in every load stage possible, with minimal hardware elements and hence minimal system cost.

It specifically teaches an initial differentiation and screening method to assign handover sequences to a specific route. This method will work perfectly when there is only one road within a covered area of several cells. However Kaplan et al does not give a full solution to the real life handover sequences received in urban areas. If a vehicle travels several times through the same route it will rarely generate the exact same handover sequence, furthermore the resemblance to handover sequences derived by traveling on different routes may be significant.

The current invention extends the work done by Kaplan et al and teaches detailed methods that efficiently and accurately correlate handover chains to a specific route, and avoid ambiguous correlations.

Furthermore the current invention teaches a method to determine the handover location accuracy for handovers within these chains.

These two steps generate a reference database that serves as a basis to locate the route on which vehicles are driving and their speed.

In addition the current invention discloses a method to correlate cellular calls by vehicles in the operational stage with the reference database and extract speed data and incident reports in real time.

SUMMARY OF THE INVENTION

The current invention describes a method for measuring traffic speed and travel time, as well as providing incident alerts, based on monitoring and analyzing cellular communications. Accurate mobile unit location is derived from the cellular communications data in specific positions and timings. This data is analyzed to derive the route on which the vehicle drives and it's speed. Data is collected and analyzed for all routes continuously thus yielding real time traffic load and speed information as well as real time incident alerts.

BRIEF DESCRIPTION OF THE DRAWINGS

FIGS. 1-A and 1-B show the cell sequences for streets 1 and 2 respectively. Using the following criteria: matching 3 out of 4 cells and requiring 3 trips at least in a cluster, 3 chain clusters were found for streets 1 and 2 as shown on FIG. 1-C. Chain clusters 1 and 3 are unique while chain cluster 2 is deleted by the ambiguity filter (3 out of 4 matches for different streets) therefore only 2 chain clusters exist in the unique chain clusters list shown in FIG. 1-D.

In FIG. 2-A the handover along the route (cell A to B) occurs as the building blocks the RF signal of cell A, the signal strength decays quickly, hence the handover from A to B will be accurate (has high location repeatability). In FIG. 2-B the handover along the route (C to D) occurs where there are no blocking elements so the signal from C decays slowly and the handover location error is much larger than the $1^{st}$ handover. The handover location accuracy can be learned from the signal strength data or from the spread of the handover locations for different drives (marked by stars in the drawing).

FIG. 3-B shows the operational drive data. The initial chain matching shown in FIG. 3-C locates the route by using 3 out of 4 cell match. Once we have found the match we have certainty that we are located on street 1. This gives us handovers 2 and 3 on the handover table. Then we search for 2 out of 3 matches forward and backward and this search adds handovers 1 and 4 to the handover table as shown in FIG. 3-D. Since we know the location of each handover in the learnt chains and we have time for each handover from the operational chain as shown on FIG. 3-E we can extract the speed.

FIG. 5-A describes the Handover flow rate over 3 route sections, A-B, B-C and C-D in regular, off peak hours, when traffic speed is around the maximal allowed speed. FIG. 5-B describes the speed within these route sections as an incident occurs (T1-T5) and later on as it is cleared (T6-T10).

FIG. 6-A describes the affect of sector edge location accuracy and partial sector coverage on speed determination. FIG. 6-B describes the speed determination over time.

DESCRIPTION OF THE INVENTION

Determination of Handover Locations and Signal Strength Along Routes (Learning)

The $1^{st}$ stage in the method is the learning stage, which is done prior to or in parallel with system installation as off-line processing. In this stage a database is created, containing handover (cell switch) sequences per route and can also contain location reference for each handover. This can be collected by actual drives on each route, and extracting the information from mobile units in the vehicles driving in any road and in any direction within a designated area.

The learning process through drives can be carried out in several ways, one of these ways is: vehicles with location determination system, such as synchronized GPS system, yielding continuously an accurate location and with operating cellular mobile unit travel across the designated area covering each road, in any driving direction and all possible turns. The handover information and the signal strength information for these mobile units are gathered and matched with the accurate location to yield the accurate location for each handover report or signal strength report.

This process may be repeated by driving several times throughout this area and by using several mobile units for each drive.

Each such drive creates for each mobile a sequence of handover reports accompanied with the accurate location of the vehicle per handover report. In addition each drive creates for each mobile a sequence of signal strength reports. Each such report includes the signal strength for several cells (up to 10) in addition to the accurate vehicle location.

All this raw data is kept in the reference database.

Assigning Handover Chains to Specific Routes

One of the ways to pre-process the recorded handover information, in order to filter ambiguous information, identify similarity criteria and save analysis time during operational stage, is as follows:

The handover raw data is processed and analyzed to create a database consisting of handover chain clusters that cover routes within the designated area.

A handover chain is a sequence of consecutive cell switches. In addition to the cell ID it may include for each handover (cell switch) the GPS location, the timing and any other relevant data. A chain cluster is a group of chains that is clustered according to a certain similarity rule. A sample of handover chains and chain clusters may be found in FIG. 1.

When we come to create this database we are faced with two phenomena:

When driving several times, or with several mobile units, through the same route, the handover sequences generated in these drives are not identical.

When driving through neighboring routes, in particular if they are parallel, similar (not necessarily identical) handover chains may be generated.

These phenomena create two problems:

Full matching of the same handover sequence in order to assign a route to a vehicle rarely occurs.

We may erroneously assign a handover sequence to the wrong route.

One of the ways to overcome these problems is to perform the following processing:

All the drives through the same route section are processed to generate clusters of handover chains. These clusters include similar (not necessarily identical) handover chains. Ambiguous handover chains are filtered. Ambiguous chains are defined as similar (not necessarily identical) handover chains relating to different route sections. A fast indexing mechanism can be then built to enable fast access to the chain clusters database.

The objective of this processing is to create a cluster database consisting of all chains that conform to specific route sections. These clusters are unique, in the sense that there is no chain in the raw data that can be assigned to two different clusters representing two different route sections. This processing is performed once, within the learn process and lays the ground to fast, accurate and ambiguity free route assignment during the operational stage.

One of the preferred embodiments of this clustering and ambiguity filtration algorithm is as follows: We cluster handover chains with L cells in a chain, All chains within a cluster are characterized in that they contain at least K, K<=L, cells that are identical to cells in a specific chain, designated as the cluster header. These K cells must be ordered in the same sequence within the chain and the cluster header. Each of these chains may include up to (L-K) cells that are not identical to cells in the header.

If a certain route was covered M times (M is the sum of the number of mobile units participating in the learning process per drive for all drives per route) We will define an acceptable cluster for a route section within the designated area as a cluster that includes at least N chains (N<=M, N>1).

Figure 1:
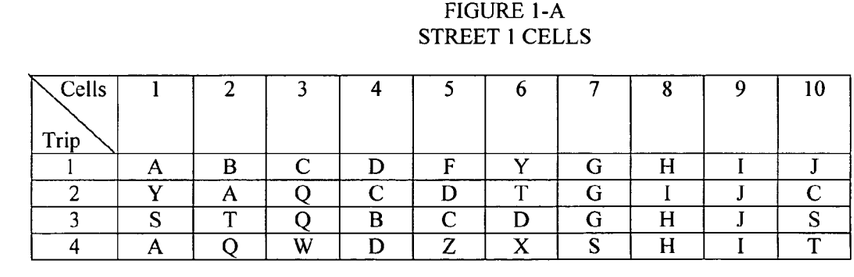
FIG. 1 shows the process of assigning unique chain clusters to specific routes and filtering ambiguous chains.

An example to the chain clustering process can be found in FIG. 1. The raw data includes inputs from 4 (M) drives in 2 streets (FIGS. 1-A and 1-B). FIG. 1-C sows the clusters created from the raw data which include at least 4 (N) chains, that have a match of 3 (K) out of 4 (L) cells.

All chains within the clusters are then processed against the raw data, another embodiment of the invention teaches initial chains processing against other chains. If a chain is found in the raw data or the chain cluster that includes at least J (J<=L) cells identical to the cells in the processed chain ordered in the same sequence, and this chain relates to a different route section than the cluster being processed, then the cluster is marked as ambiguous and erased from the clusters database.

An example for this filtration process is shown in FIGS. 1-C and 1-D whereas cluster no. 2 includes chains both from street 1 and street 2 and it is discarded and not included in the unique chain clusters.

Different routes within the designated area will accept different J, K, L, M and N values, according to the route topography and density, cell coverage etc.

In order to enable very fast access to the clusters database a fast access mechanism (such as hashing) can be implemented. The fast access system is built once during the learning stage and updated afterwards if necessary.

If the area analyzed by this algorithm is small enough and the processing power is large enough, this ambiguity analysis can be conducted in real time, in conjunction with a handovers sequence received during the operational stage, and provide correlation result such as detailed in Operational stage below.

Defining Handover Accuracy

If very accurate location and speed information is needed, further analysis is needed to measure and define the accuracy level for each handover in the chain clusters.

This can be done in several ways, such as:

By using the signal strength pattern for the relevant cells

By measuring the location spread of handovers between the same cells for different chains within the cluster (different trips).

Any combination of the above two ways.

The accuracy level per handover can be kept within the cluster database.

One of the preferred embodiments of this accuracy defining algorithm is as follows:

Each handover is performed between a submitting cell and a receiving cell. We follow the signal strength of the submitting cell around the handover location. If the power of the submitting cell decays very quickly (typically as a result of RF blocking and reflecting elements) then this handover is assigned a high accuracy level. If the power of the submitting cell decays very slowly then this handover is assigned a low accuracy level.

If the phenomena in the $1^{st}$ option occurs more than once within the route, it still may be used for location reference if the different appearances can be distinguished by different sequences in which they appeared in.

Figure 2:
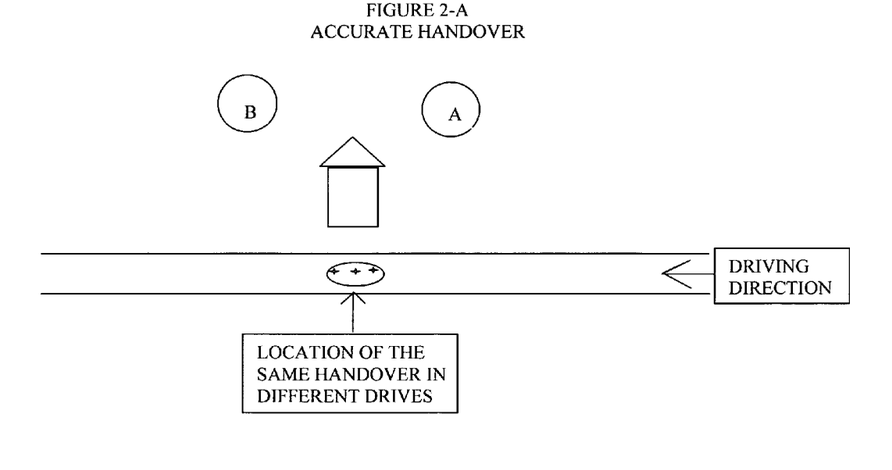
FIG. 2 demonstrates the handover accuracy definition.

Another preferred embodiment of the accuracy defining algorithm is to evaluate the spread of similar handover locations. For example: find the average of all similar handovers within a cluster, and decide whether this is an accurate handover according to the maximal location distance of the handovers from the average An example for different infrastructure and its effect on the handover location accuracy is given in FIG. 2. The handover location for all similar handovers within a cluster are processed to generate the actual distance between the handover locations, the average handover location and an indicator for handover accuracy. All this data is kept in the learned database.

Learning Stage for Highways Only

In case of detecting speed and incident of highways only, and there are only few highways in the relevant sub area that differ in volume of traffic at least for some time, the learning stage can be done without driving mapping procedure at all. In this case the system records the sequences over the relevant area for a significant time period to enable statistical analysis. Traffic volume information is fed into the system from external sources such as government reports and burro of statistics. The volume of correlated sequences and the volume of traffic is then analyzed to correlate between clusters of sequences and the highways route sections, and to filter sequences of small roads around it.

Other sources of information can be used instead of external traffic volume information, such as the location of the cellular antennas, information from a single drive on the highways etc.

In such cases the system can collect virtually all possible chains for every highway and insert them to the learnt database.

Operational Stage—Correlating Handover Sequences with Routes and Call Follow Up.

During the operational stage, events related to calls on the cellular system are monitored. The monitoring can be performed from the base stations (BS), base station controllers (BSC), main switching systems (MSC) or communication links between them.

One of the preferred embodiments of the current invention is by connecting to the links between the BSC and the MSC near the MSC. This type of connection is highly efficient in the sense that it involves connection to a minimal number of links and all of them are on the same physical location. Since the relevant information that can be extracted from these links is limited to handovers and their timing, it is one of the major breakthroughs of this invention, that enables extracting traffic data from such limited information.

Another preferred embodiment of the current invention is by extracting the handover and call processing related messages only thus minimizing the scope of information to be handled.

In such case, if the traffic extraction system is loaded with too much processing, it can extract only part of the calls when the cellular system or parts of it (a certain location area or BSC) is loaded to minimize the processing, where as these parts of the calls are enough in these parts of the cellular system for accurate and full location, speed and traffic load detection.

These events can be extracted and handled in real time, and there is no need to wait for a call to terminate in order to handle its events but rather handle each event as soon as it is extracted. This has a very high importance in incident detection as detailed bellow.

The learnt database is used to match the operational calls. This data may reside on a hard disk or in the computer's memory for faster response times.

The monitored events include, among others, the following events:
  Call processing events (start, end, call waiting hold, resume etc.)
  Location related events (Handovers, location area change etc.)

A call number and mobile ID (that can't identify the mobile phone participating in the call in order to avoid privacy violation) can be attached to each call to enable following the call and the mobile as they proceed across the covered area.

The location related events are used to pinpoint the route section which the vehicle is driving on and to determine the vehicle location (and location accuracy) in certain locations during the call.

The initial rough location of a vehicle can be done using the location area data or the actual link that supplies the data.

In order to identify the route section of the vehicle with a very high probability of detection on one hand and perform the initial detection quickly and efficiently on the other hand, we can use mechanisms such as the Unique Chain Clusters for initial route identification. We can also access the clusters database using the fast access mechanism.

In order to have a high probability of detection we can take a chain of P cells generated in the operational stage with at least Q (Q<=P) cells matching those in the clusters database where the cells in both chains are ordered in the same order. Of course P and Q may change in values, according to the route topography and density, cell coverage etc.

Figure 3:
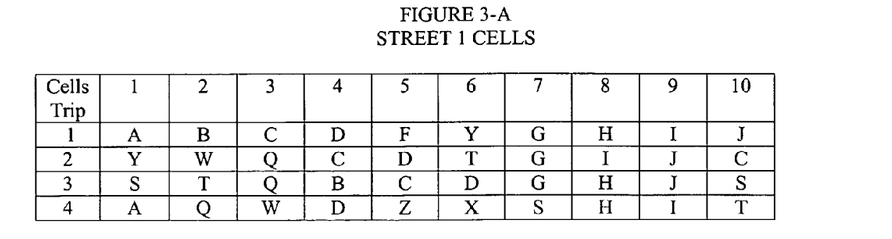
FIG. 3 shows how handover locations are extracted from the operational drive data including only cell ID and time data. The learnt cell chains for street 1 are shown in FIG. 3-A.

FIG. 3 demonstrates the initial detection stage. FIG. 3-A details the raw data and FIG. 3-B shown the relevant cell clusters. FIG. 3-C shows the operational drive data and FIG. 3-D shows the initial matching of 3 (O) out of 4 (P).

This match may not be found for each chain in the operational data. If this match is not found even for a single sub chain of a call than this call is not matched, and will not be used, unless new cells for this call will generate at least one sub chain that can be matched.

In order to achieve higher level of confidence against ambiguities, an optional stage can be conducted, in which the raw database is scanned to find a matching chain (Q out of P cells) to the operational drive chain at another route section. If such a chain is found then the current operational chain is discarded.

Once we have initial matching we can continue in parallel in two ways:
  Try to match handovers (cells) before or after this sub chain to match more cells for this call. This is done by following the raw data chains in the database looking for R out of S matches, where R<=S and S is typically smaller than P (since we have high certainty of the route and we just need to match more cells between the learnt database and the current call). This secondary matching process is performed both forward for cells following the matched chain and backwards for cells preceding the matched chain. FIG. 3-E shows this secondary matching process whereas the cells S, T, J and S from the operational drive (FIG. 3-C) are matched to trip 3 within the raw data (FIG. 3-A) using 2 (R) out of 3 (S) match, after the initial stage detected a match for the chain BCDG. Continue and find additional chain matches to sub chains within the current call.

If a chain which is a part of the current call is matched with more than one route in the learnt database, this part of the call is declared ambiguous and will not be used to extract speed, unless another part of it will be uniquely matched at a later stage, and this information will enable going backwards and re-matching the previous part of the call.

The matching can also be measured in similarity score, such as between 1 to 100, and the analysis for matching or filtering due to ambiguity can be conducted according to a matching threshold, that takes into consideration similarity of a sequence to several routes.

This threshold can very in different sub-areas and according to the amount of data available for each route or sub-area in any given moment.

The next step can be to extract from the learnt database the locations of the handovers along the matched route sections, along with their actual timing and location accuracy. This stage is demonstrated in FIG. 3-F.

The matching procedure between the learnt database and the new chain can be done without building clusters, but rather by comparing the new chain directly with the raw chains in the learnt database. This way the processing required during the operational stage is larger, and may cause some time delays in providing the traffic information.

Following this procedure for many calls within the covered area continuously results in a stream of times, route sections, locations on the route and location accuracies for each call.

It is worth to note that at this stage the data does not include any cellular system related information, So from now on a cellular operator will not be sensitive to use or dissemination of this data.

The system can thus be divided into 2 parts: the $1^{st}$ part that performs all processing that requires cellular operator confidential data such as handovers and the $2^{nd}$ part that handles only location and timing data, The $2^{nd}$ part can use other sources of information, such as Information from vehicle monitoring systems, to monitor traffic status.

Operational Stage—Incident Detection

Real time incident detection is crucial for incident management, as well as for traffic routing.

When an incident occurs vehicles might significantly slow down or completely stop, and the flow of handovers from these vehicles might stop.

One of the preferred embodiments of the current invention enables to detect incidents in real time. One of the ways to it can be as follows:

The next possible cells for each call are extracted from the database, and their distance and excepted timing (according to the vehicle speed) from the preceding cell is calculated. Once N seconds have passed since the last handover for a call and the next handover did not occur (and the call still continues) this means the vehicle have slowed down or stopped. For this vehicle we can easily calculate the maximal possible speed for this route section.

Figure 4:
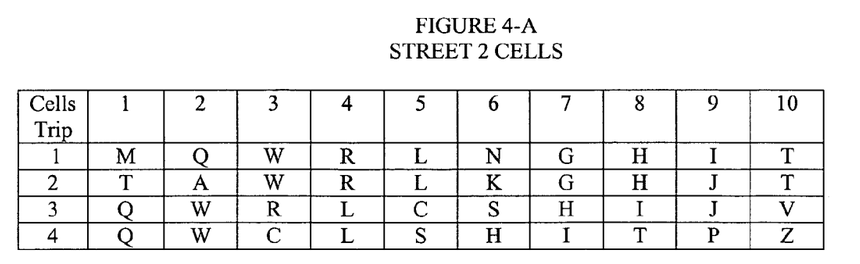
FIG. 4 shows how an incident that caused traffic to stop or slow down is detected without any additional handover data received. The learnt cell chains for street 2 are shown on FIG. 4-A. Operational drive data is shown on FIG. 4-B. The last handover was R to L. Since then 1 minute have passed and we have not received additional cells and without receiving "end of call" message. Looking at FIG. 4-C we know that the longest distance to the next handover is 200 meters, so the maximal speed is 12 KM/H (shown on FIG. 4-D). When another minute passes without any new cell received the maximal speed goes down to 6 KM/H (FIG. 4-D).

An example to incident detection using this method is shown at FIG. 4. As the time passes (N=60 for the $1^{st}$ line in FIG. 4-D and 120 for the $2^{nd}$ line in FIG. 4-D) and no new handover is received the maximal speed decreases (from 12 Km/H to 6 Km/H).

If this happened just for several vehicles concurrently this is a high probability indication for an incident along this route section. Since we know where the relevant vehicles are driving according to the correlation procedure we can detect the location of the incident.

Using Handover Rate for Speed and Incident Status Extraction.

In another embodiment of the current invention traffic speed on a route section is extracted in the following way:
1. In a calibration phase the speed along the route section is measured by external means (e.g. Driving along this route section and recording the speed) and in parallel the handovers (Cells switch) rate (handover time density) for this route section is monitored. The data for all route sections is kept in a database.
2. In the operational stage the handover rate along route sections is monitored and by comparing it to the rate measured during the calibration phase the actual speed along the route section is calculated.

The calibration phase can also be conducted without traffic speed measurements, by recording traffic density over a period of time on a route section, filtering extreme measurement samples, and then normalizing it according to the max average speed that is customary on this route section.

This method is a little less accurate for detecting speed, but is accurate enough to detect speed changes in a case of an incident.

This method can be used for incident detection where incident on a specific route section is detected when the handover rate over this route section decreases rapidly and an incident clearance is detected when the handover flow increases rapidly.

Figure 5:
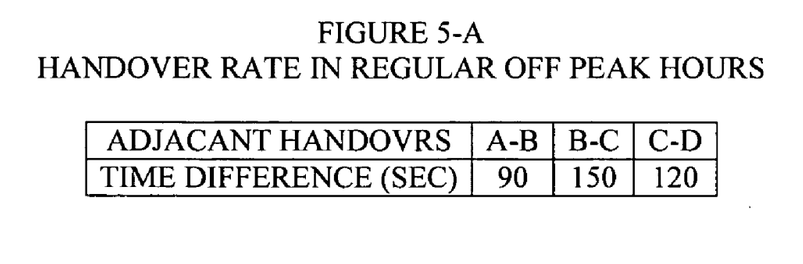

FIG. 5 demonstrates incident occurrence and clearance detection. The incident occurs at T2 on section B-C and causes significant slow down on this section while A-B slows down in a delay (T3-T5) and C-D is not affected. When the incident is cleared at T6 B-C is cleared first (until T9) and A-B afterwards (until T10), while a temporary traffic slow down is created on C-D (at T6-T9) as the vehicles from A-B and B-C start moving forward but is cleared quickly.

Operational Stage—Measuring Speed and Travel Time in Route Sections and Handling Traffic Incidents At this stage the location data and incident occurrence and clearance reports per each route section can be analyzed in order to extract speed and travel time, alarm on incidents along this route section and notify on incidents clearance.

Notification on incident clearance can be done whenever the speed over a route section increases significantly or whenever an incident clearance report is received. Incident clearance may be notified independently or may be notified only when an incident alarm was made for the same route section.

In addition we can extract the speed along several route sections if data from the same call or the same mobile unit covers several route sections. This is done because, for the same location accuracy in the start and end locations, the speed accuracy is higher as the distance between the start and end locations is larger.

Figure 6:
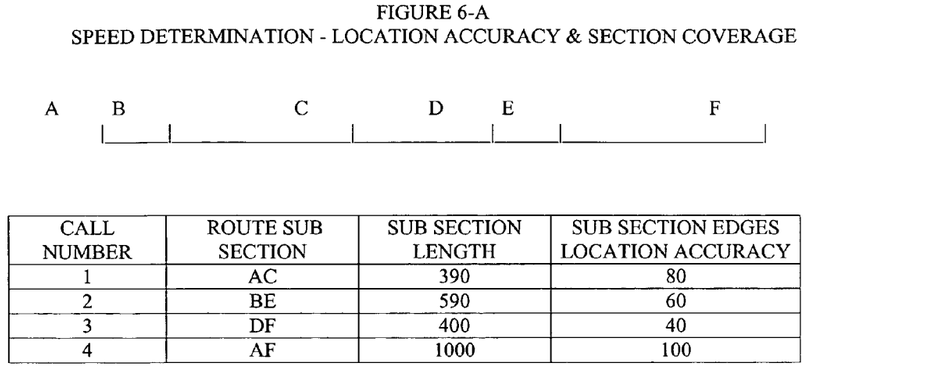

This is demonstrated by FIG. 6-A. If the coverage of a 1 Km. Route section (A-F) is combined from coverage of sub-sections (calls 1-3 covering sub sections A-C, B-E and D-F) then the aggregate error is 180 meters (80+60+40=180) and creates an error of +−90 meters along the 1 Km. (+−9%). If on the other hand the speed is measured based on call 4 that covers the full section A-F, even with a high edge location accuracy (100 meter) the resulting speed accuracy will be +−5%.

There are several factors to be taken into account when determining the speed accuracy per route section:

The number of reports for this section.

The timing of the location reports relative to current time (How "old" are the reports)

The coverage percentage and overlap of the speed sub sections within the route section.

The location accuracy of the edge locations.

FIG. 6-A demonstrates the issue of location accuracy as discussed above. It involves a simple method of summing the location accuracy figures. Additional methods such as RMS summation can be applied. It also demonstrates partial coverage: If the only information includes calls 1 and 3 then sub section C-D is not covered and when we calculate the speed on the section A-F as a weighed average of the existing sub sections (A-C and D-F) then this is less accurate then an average covering the full section.

FIG. 6-B demonstrates the importance of differentiating between old and new reports. If all reports between 8:40 and 9:00 are averaged the result is 68 Km/Hour, where as if we apply the simple method of rolling 10 minutes average are calculated then the relative speed for 8:40-8:50, 8:45-8:55 and 8:50-9:00 are 65, 67 and 72 Km/Hour, and we can see the speed change over time. Additional methods such as weighed averaging may be used.

Using these criteria the speed along each route section can be calculated every T seconds (T may change as a function of time, number of reports etc. In FIG. 6-B T is 300 seconds or 5 minutes)

Operational Stage for Highways Only

In case that traffic monitoring need to be conducted for highways only as described in the relevant section in the learning phase, the learnt database can virtually contain all possible sequences, and correlation procedure for new sequences is easier since the system can use simpler options for correlation, such as K=N and P=Q, Operational Stage—Virtual Sensor One of the implementations of the current invention is in traffic control systems. These systems traditionally consist of road sensors that are connected to a control center. This kind of system is inferior to the method taught in the current invention because it has a much higher cost, measures only the momentary speed at the sensor location and is late at incident detection. Nevertheless, it will be required to implement the methods taught in the current invention as an addition to existing system based on traditional sensors. This will require significant changes in the control center to support such a hybrid system. In order to minimize the efforts and cost required to install such a hybrid system, even at the loss of some of the advantages mentioned above, virtual sensors are defined that extract from the cellular network the speed at several specific locations along the routes in the covered area and emulate the communication protocol between the control center and the road sensors in software.

Enhancing Routes Coverage by Operational Stage Data

During the operational stage large quantities of handover chains are received by the system and matched to the learnt database. The database can be enhanced to supply better coverage in the following manner:

In the 1 st stage the system takes new chains that were matched to a certain route section and assigns each of the matched handovers in the new chain the location of the handover from the learnt database that was matched to it.

The rest of the handovers in the new chain, that were not assigned a location yet, are assigned locations now according to the following approximation:

Each of these non-matched handovers, which is between 2 matched handovers, is assigned a location according to the distance from each of the matched handovers near it across the route. This distance is calculated assuming steady speed between the 2 matched handovers, i.e. distance=(distance between the 2 matched handovers)* (time between matched handover and the non-matched handover)/(time between the 2 matched handovers).

If more than 1 non-matched handover is located between 2 matched handovers the calculation is done for each of the non-matched handovers separately according to the calculation above.

This new matched chain is than added to the learnt database and the handovers that were not matched are marked as potentially inaccurate.

If the same handover is assigned the same location in several different chains its accuracy level can be updated according to the variance of the different results.

Adjusting the Learnt Database to Changes in the Cellular System.

Cellular systems are changing from time to time and portions of the learnt database can become inappropriate. One of the preferred embodiments of the current invention is a method that minimizes the need for re-conducting the learning procedure by detecting changes in the cellular system and updating the learnt database by using data gathered during the operational stage.

The system can identify a chain cluster or chains in the learnt database, that statistically were matched X times per day, are matched only Y times per day, and Y<<X, or even does not appear at all. This cluster or chains appear at a certain location across a certain route and has chains preceding or following it.

In such a case the system can trace new sequences located after the preceding or before following chains, looking for a new cluster of chains, that were not common before, or did not exist at all before, and their current appearance rate is very similar to X.

This new cluster of sequences is then assigned the route of the cluster that appears significantly less or does not appear at all.

The system can then try several similarity criteria to match handovers from the old cluster to handovers in the new cluster, in order to assign handovers in the new cluster with accurate location. Examples for such similarity algorithms are described previously in this invention.

Once several handovers from the new cluster are assigned location, the system may use the method from the previous section in order to assign location to the rest of the handovers.

The invention claimed is:

1. A method for correlating a vehicle with the road on which it travels based on cellular communication, the method comprising the steps of:

gathering a sequence of cellular network events related to one or more mobile units, and a physical, geographically-defined, accurate location of each mobile unit determined by a physical geographically-defined, accurate location determination system when each cellular network event occurs, such cellular network events and physical, geographically-defined accurate locations being gathered during one or more drives and then stored as entries in a learnt database as a location reference; and conducting analysis of a new sequence of cellular network events related to a particular mobile unit, the new sequence of cellular network activity events being gathered during a new drive and is independent of physical, geographically-defined location information, in conjunction with the learnt database to correlate the new sequence of cellular network events to a physical geographic location;

whereas the new sequence of cellular network events is extrinsically collected from the base stations or the controllers or main switching systems or communication links between them and whereas the new sequence of cellular network events is processed to overcome the problem of similar sequences for neighboring routes and whereas the step of conducting analysis is performed for areas in which at least two roads are covered, at least partially, by the same two or more cells.

2. The method of claim 1, wherein the sequence of cellular network events may include a handover event and wherein the step of gathering a sequence of cellular network events further comprises the step of:

clustering handover chains in the learnt database according to a similarity algorithm so that each cluster contains at least similar N chains (N<=M, N=>1), where N and M may vary for different route sections and where M is the number of times a route was covered in the learning process.

3. The method of claim 2, wherein the similarity algorithm comprises the step of:

each of the chains in a cluster of L cells has at least K (K<=L) cells that appear in the same order as in a header, where K and L may vary for different route sections.

4. The method of claim 2, wherein ambiguous chain clusters, which are clusters in which at least one of the chains has similarity to chains related to a different route section, are filtered.

5. The method of claim 4, wherein clusters have similarity if at least for one of the chains within a first cluster, another chain is found in a second cluster that includes at least J (J<=L) cells that appear in the same order, and this chain relates to a different route section than the first cluster, where J and L may vary for different route sections, and, if the first and second cluster have similarity, both clusters are filtered.

6. The method of claim 4, wherein a cluster has similarity to a raw data chain if at least for one of the chains within the cluster, another chain is found in the raw data that includes at least J (J<=L) cells that appear in the same order, and this chain relates to a different route section than the cluster, where J and L may vary for different route sections, and, the cluster having similarity is filtered.

7. The method of claim 1, wherein the step of gathering a sequence of events includes calculating an accuracy level of a handover in one or a combination of the following ways:

using signal strength measurements to detect sharp decays in signal strength resulting in a handover and thus determine handovers accuracy level;

measuring the location spread of handovers between the same cells for different trips over the same route to determine handover accuracy level and average location.

8. The method of claim 1, wherein the step of conducting analysis further comprises:

matching chains from new drives to the learnt database by searching for a chain of J cells that has at least K (K<=J) cells that appear in the same order, both in a chain from the new drive as well as in a chain from the learnt database, whereas J and K may vary for different route sections;

assigning the route of the chain from the learnt database to the new chain that was matched.

9. The method of claim 8, wherein the step of conducting analysis includes a secondary matching procedure comprising the step of matching cells before and after the match previously detected by following raw data chains in the learnt database backward and forward relative to the matched chain and looking for an L out of M (L<=M) cells match where as M is typically smaller than J, and whereas J is the number of cells in the chain, and where as L and M may vary for different route sections.

10. The method of claim 1, wherein the step of conducting analysis detects the vehicle location at specific points along the route by:

extracting handover information comprised of cell pairs, physical geographically-defined location, timing, and accuracy information from handover chains in the learnt database that match a new chain of handovers; and calculating location and accuracy of handovers in the new chain of handovers according to the handover information extracted from the learnt database that relate to the same route section and contain the same cell pairs.

11. The method as in claim 1, where in the step of conducting analysis to correlate the new sequence of events to a specific route, further comprises conducting analysis to detect traffic incidents by:

if another mobile unit is in a call and no new handovers have been received for a time T, a distance D to a farthest possible handover location to a possible next cell is used to calculate a maximal possible speed at a current route section as follows: Max Speed <=D/T and if this speed is below a speed threshold S then a possible incident report is issued for this route section.

12. The method as in claim 1, wherein the step of conducting analysis is based only on cell ID data.

13. The method as in claim 1, wherein the step of conducting analysis is based on extracting new events from a different percentage of calls in different parts of the cellular system.

14. The method of claim 2, wherein the step of conducting analysis further comprises:

matching handover chains from new drives to handover chains in the learnt database; and filtering out new handover chains that were matched with handover chains in the learnt database which represent more than one route section 15. The method according to claim 2, wherein the step of conducting analysis includes detecting physical geographic locations of mobile unit at specific points along a route by:

extracting handover information including cell pairs, physical geographically-defined location, timing, and accuracy information from handover chains in the learnt database for a new handover chain that includes cell pairs that match with cell pairs in the handover chain in the learnt database; and calculating the physical geographic location and accuracy of handovers in the new handover chain according to the handover information extracted from the learnt database that relates to the same route section and contains the same cell pairs.

16. The method according to claim 15, wherein the physical geographically-defined location, timing and accuracy information is further used to calculate traffic speed per each route section.

17. The method according to claim 15, wherein the physical geographically-defined location, timing and accuracy information is used to detect traffic incidents.

18. The method of claim 1, wherein the step of conducting analysis detects traffic incidents by:

collecting handover time density information for each route section;

alerting of probable incidents whenever the handover time density of a new chain decreases rapidly.

19. The method of claim 1, wherein the step of conducting analysis detects incident clearance by:
   collecting handover time density information for each route section; and
   notifying of incident clearance whenever, after an incident, the density of new chains increases significantly.

20. The method of claim 1, wherein the step of conducting analysis detects traffic speed by:
   including a calibration stage in which traffic speed of a route section is correlated with the rate of handovers for this route section at the same time; the handover rate is measured continuously and by comparing to the handover rate in the calibration stage the speed for the route section is extracted.

21. The method of claim 1, wherein virtual sensors detect the speed at certain specific locations across routes within a covered area and emulate the communication protocol between traditional road sensors and the control center in a hybrid traffic control system.

22. The method of claim 1, wherein the step of conducting analysis further comprises continuously updating the learnt database by:
   estimating the physical geographic location of handovers within matched sequences that do not appear in the database; and
   adding new matched sequences to the learnt database.

23. The method according to claim 2, wherein the step of conducting analysis further comprises detecting changes in the cellular system and adjusting the learnt database by:
   monitoring the matching rates of chains or clusters of chains with chains in the learnt database to detect decreases in the matching rates;
   find new clusters that were rarely matched or not matched at all, that appear in the same locations, according to preceding or following chains; and
   compare statistics of the number of matches per cluster and find new clusters to replace clusters that are rarely matched.

24. A method for correlating a vehicle with the road on which it travels based on cellular communication, the method comprising the steps of:
   gathering a sequence of cellular network events related to one or more mobile units, and a physical, geographically-defined, accurate location of each mobile unit determined by a physical geographically-defined, accurate location determination system when each cellular network event occurs, such cellular network events and physical, geographically-defined accurate locations being gathered during one or more drives and then stored as entries in a learnt database as location reference; and
   conducting analysis of a new sequence of cellular network events related to a particular mobile unit, the new sequence of cellular network activity events being gathered during a new drive and is independent of the physical, geographically-defined location information, in conjunction with the learnt database to correlate the new sequence of cellular network events to a physical geographic location-;
   conducting analysis of a new sequence of cellular network events related to a particular mobile unit, the new sequence of cellular network activity events being gathered during a new drive and is independent of physical, geographically-defined location information, in conjunction with the learnt database to correlate the new sequence of cellular network events to a physical geographic location;
   whereas the new sequence of cellular network events is extrinsically collected from the base stations or the controllers or main switching systems or communication links between them and whereas the new sequence of cellular network events is processed to overcome the problem of similar sequences for neighboring routes; and
   wherein the step of conducting analysis further comprises: matching chains from new drives to the learnt database by searching for a chain of J cells that has at least K ($K<=J$) cells that appear in the same order, both in a chain from the new drive as well as in a chain from the learnt database, whereas J and K may vary for different route sections; and
   assigning the route of the chain from the learnt database to the new chain that was matched.

25. The method of claim 24, wherein the step of conducting analysis is performed for areas in which at least two roads are covered, at least partially, by the same two or more cells.

26. A method for correlating a vehicle with the road it travels on based on cellular communication, the method comprising the steps of:
   collecting handover sequences statistics for a relevant area;
   collecting road traffic volume information for each route in the relevant area from external sources for roads that differ in traffic conditions;
   assigning handover sequences to routes according to volume comparison analysis; and
   conducting analysis of new handover sequences from new drives in the relevant area in conjunction with the previously collected handover and traffic volume information to identify a route at certain time points during cellular phone calls.

* * * * *